July 27, 1954
H. G. BECK
2,684,524
APPARATUS FOR ASSEMBLING A TUBULAR ELASTIC
RUBBER INSERT BETWEEN AN OUTER RIGID
CASING AND AN INNER RIGID CORE
Filed May 2, 1949
2 Sheets-Sheet 1
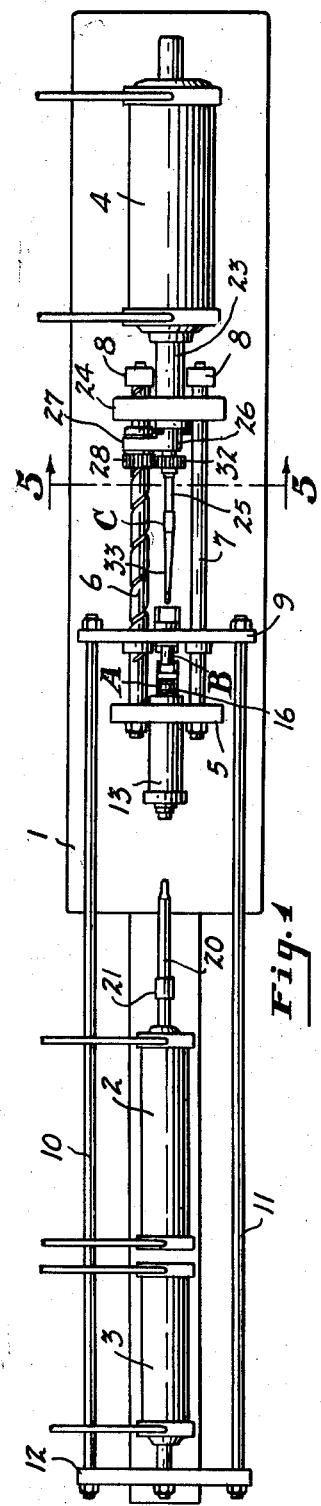
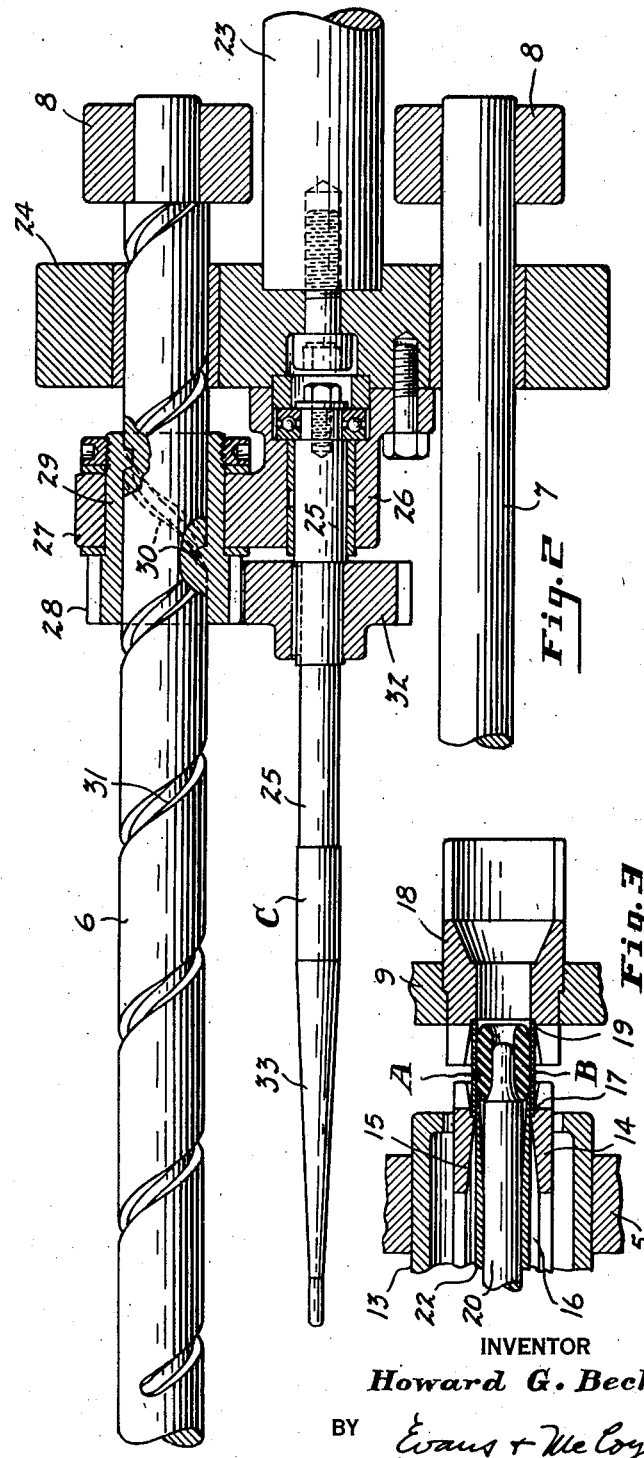
INVENTOR
Howard G. Beck
BY Evans & McCoy
ATTORNEYS

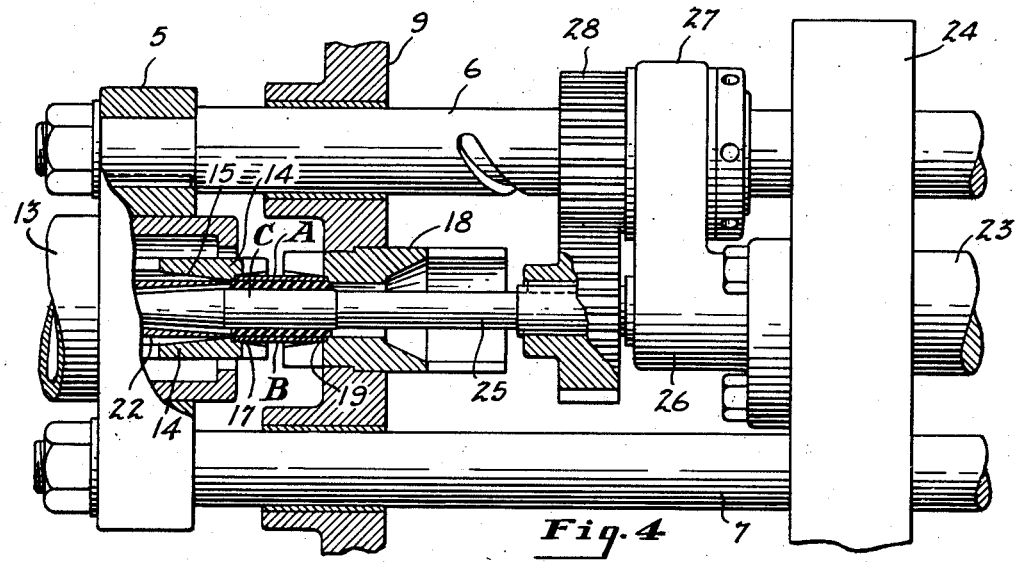

Patented July 27, 1954

2,684,524

UNITED STATES PATENT OFFICE 2,684,524

APPARATUS FOR ASSEMBLING A TUBULAR ELASTIC RUBBER INSERT BETWEEN AN OUTER RIGID CASING AND AN INNER RIGID CORE

Howard G. Beck, Wabash, Ind., assignor to The General Tire and Rubber Company, Akron, Ohio, a corporation of Ohio Application May 2, 1949, Serial No. 90,992

1 Claim. (Cl. 29—235)

This invention relates to a method of and apparatus for assembling yieldable cushioning units that consist of an outer tubular casing, an inner rigid core and an elastic rubber insert that is retained in a narrow annular space under radial compression around the core and within the casing.

In assembling such cushion units it is common practice to force the elastic vulcanized rubber insert through a funnel-shaped guide that registers with the tubular casing and from the guide into the casing, and then to force the core axially into the tubular insert behind a tapered pilot while axial movement of the casing and insert is restrained.

The initial operation requires only relatively light pressure because the rubber of the insert is free to expand radially inwardly while it is being contracted by its passage through the funnel-shaped guide. The core inserting operation, however, requires heavy presure because of the fact that the inserts can expand only in an axial direction and against the movement of the core in the narrow space between the core and casing. For this reason cushioning units so produced are often defective due either to damage to the vulcanized rubber insert or to improper positioning of the insert.

The present invention has for its object to provide a method of and apparatus for assembling cushioning units of the character referred to that will reduce the pressure required to insert the core and that will facilitate the uniform axial expansion of the insert during the entry of the core into the insert, reducing the power required for introducing the core, and greatly decreasing the percentage of defective units produced.

Reference should be had to the accompanying drawings forming a part of this specification, in which:

Figure 1 is a plan view of apparatus embodying the invention;

Fig. 2 is a fragmentary horizontal section showing a portion of the core carrying plunger and the means for imparting rotation thereto during its advancing movement;

Fig. 3 is a fragmentary horizontal section through the casing clamp, showing the elastic rubber insert placed within the casing;

Fig. 4 is a fragmentary horizontal section showing the core inserting plunger fully advanced and the assembly of the unit completed;

Fig. 5 is a transverse section taken on the line indicated at 5—5 in Fig. 1;

Fig. 6 is a fragmentary longitudinal section showing a tubular core member connetced to a tapered pilot and to the core inserting plunger;

Fig. 7 is a transverse section taken on the line indicated at 7—7 in Fig. 6; and Fig. 8 is a transverse section taken on the line indicated at 8—8 in Fig. 6.

The cushioning unit, which is of a type commonly used in articulated joints, vibration dampening supports and the like, comprises a tubular elastic rubber insert A, a tubular outer casing B and a tubular core C. The casing B and core C are rigid members, usually in the form of metal tubes, and the insert A is normally of an external diameter greater than the internal diameter of the casing, and of an internal diameter normally less than the external diameter of the core. When assembled in the narrow annular space between the casing B and core C the insert A is under considerable radial compression and is of considerably reduced radial thickness and increased length as shown in Fig. 4.

Cuschioning units of the character described are commonly formed by first contracting the tubular insert and forcing it axially into the casing, after which the casing and insert are held while a tapered pilot having the core attached to its large end is forced through the insert and the core carried into position within the insert behind the pilot. The two operations may be performed on separate machines or may be performed on a single machine such as shown in my Patent No. 2,660,780, December 1, 1953.

The present invention is based upon the discovery that the placing of the core within the insert is greatly facilitated by rotating the core and pilot during their axial movement within the insert.

In the accompanying drawings the invention is shown applied to a machine of the type shown in my copending application above referred to, in which an elongated table 1 has three axially alined fluid pressure cylinders 2, 3 and 4 mounted thereon, the cylinders 2 and 3 being mounted at one end of the table and the cylinder 4 at the opposite end. Substantitally midway between the cylinders 2 and 4 a fixed standard 5 is attached to the table 1 and to this standard there are attached two parallel guide rods 6 and 7 which extend from the standard 5 toward the cylinder 4, the rods 6 and 7 being attached to posts 8 carried by the table adjacent the cylinder 4. A crosshead 9 is slidably mounted on the rods 6 and 7 and is connected by parallel tie rods 10 and 11 to a crosshead 12 which is operated by the cylinder 3.

Mounted in the standard 5 in axial alinement with the cylinders there is a cylindrical housing 13 in which is mounted a slide 14 which moves axially of the housing and which has a funnel guide 15 and an insert receiving portion 16 adjacent the large end of the funnel which supports the insert A in axial alinement with the funnel. The end of the slide 14 facing the crosshead 9 has a casing receiving socket 17 and the crosshead 9 carries a tubular clamping member 18 that has a casing receiving socket 19 alined with the socket 17 of the slot. When the casing B is clamped between the slide 14 and clamping member 18 it is held in axial alinement with the housing 13 and cylinders 2, 3 and 4 and in resigtry with the small end of the funnel guide 15.

Operation of the cylinder 3 causes the crosshead 9 to move toward the standard 5 and clamp the casing B between the slide 14 and clamping member 18 in position to receive the insert A when it is forced through the guide 15. For introducing the insert into the casing the cylinder 2 carries a plunger 20 that is adapted to move axially through the casing 13 into engagement with the insert A and move the insert A through the funnel 15 into the casing B to the position shown in Fig. 3. The plunger 20 has a collar 21 attached thereto that engages with a follower plunger 22 within the housing 13 which is of an external diameter but slightly less than the internal diameter of the casing B and which engages with the insert A outwardly of the plunger 20 to insure the proper positioning of the insert within the casing B.

The cylinder 4 has a piston 23 that is attached to a crosshead 24 mounted to slide on the guide rods 6 and 7. The crosshead 24 carries a core inserting plunger 25 that is axially alined with the cylindrical housing 13 and that is rotatably mounted in a bracket 26 that is rigidly attached to the crosshead 24. The bracket 26 has a laterally extending arm 27 which supports a gear 28 that has an elongated hub 29 journaled in the arm 27 and slidable on the rod 6. The hub 29 also has a helical internal rib 30 that slides in a helical groove 31 in the rod 6 so that a turning movement is imparted to the gear 28 during movement of the crosshead 24 and bracket 26 along the guide rod 6. The gear 28 meshes with a gear 32 fixed to the plunger 25 to impart turning movements to the plunger 25 during its advancing and retracting movements.

To enable the core C to enter the insert A, an elongated tapered pilot 33 is provided that is small enough at its small end to readily enter the insert placed within the casing B and that tapers to a diameter at its large end equal that of the core C. The pilot 33 has an end portion 34 that fits in the tubular core C and also has a positioning shoulder 35 at the large end of its tapered portion against which the end of the tubular core seats.

The plunger 25 has a reduced core receiving portion 36 and a shoulder 37 against which the core member seats. Inwardly of the portion 36 the plunger has a reduced cam portion 38 around which a series of radially movable rollers 39 are mounted in such manner that they are adapted to have frictional clamping engagement with the interior of the core member C. Each of the rollers 39 has reduced ends 40 and these ends are mounted for radial movement in annular channels 41 and 42 formed in a shoulder at the outer end of the cam portion 38 and in the face of a retaining collar 43 that is secured to the plunger 25 by means of a locking ring 44. The cam portion 38 is provided with a series of lobes 45 which have inclined faces engageable with the rollers 39 to move the rollers radially outwardly and press them against the interior of the tubular core C upon rotation of the plunger in the direction in which it is turned during advancing movement thereof.

The end of the pilot 34 within the core member is provided with a transverse slot 46 which receives a tongue 47 projecting from the end of the plunger 25. The core member C is assembled with the pilot 33 on the plunger 25 as shown in Figs. 2 and 6 and, after the core member A has been inserted into the casing B, the plunger 25 is advanced by means of the cylinder 4 to enter the pilot 33 into the insert A.

The plunger 25, the core member C and pilot 33 are rotated by the gears 28 and 32 during their advancing movement, and when the core member C is brought into engagement with the rubber insert the frictional resistance to turning movement will cause the rollers 39 to be moved outwardly by the cam 38 to firmly grip the core and hold it against turning movement with respect to the plunger 25 so that the core member is rotated during its movement into the casing until it reaches its final position shown in Fig. 4. During the movement of the core member into the casing the casing B is held stationary by the clamping cylinder 3 which holds the slide in fully retracted position with respect to the housing 13 and the insert A is engaged with the tubular plunger 22 which serves to restrain axial movement of the insert during insertion of the core, the plunger 22 being at its outer limit of movement during the core inserting operation. When the plunger 25 reaches the end of its stroke its movement is reversed, causing reverse rotation of the gears 28 and 32 and plunger 25, causing the cam portion 38 to turn with respect to the core C in a direction to free the rollers 39 which bind the plunger 25 to the core so that withdrawal of the plunger from the core is not impeded. Since the plunger 25 has a loose fit in the end of the pilot 33, the pilot will be disengaged when the plunger is retracted. During movement of the core member into the casing the elastic rubber insert is forced to expand axially toward the end of the casing engaged by the clamping member 18 and expansion of the insert is freer and more uniform due to the turning movement of the core member during its axial movement within the insert.

It is to be understood that in accordance with the provisions of the patent statutes, variations and modifications of the specific devices herein shown and described may be made without departing from the spirit of the invention.

What I claim is:

Apparatus for assembling a tubular elastic rubber insert between an outer rigid tubular casing and an inner rigid core, comprising a plunger, a tapered pilot, means for detachably securing the plunger pilot and core together in axial alinement and against relative turning movements with the core between the pilot and plunger, a support having means for holding said casing and insert in axial alinement with said plunger, means for advancing said plunger toward said casing, means for restraining axial movement of the casing and insert during the advancing movement of said plunger, and means for rotating said plunger and core during advancing movement of said plunger.

References Cited in the file of this patent

UNITED STATES PATENTS

| Number | Name | Date |
|---|---|---|
| 1,462,305 | Snyder | July 17, 1923 |
| 1,830,814 | Thiry | Nov. 10, 1931 |
| 1,913,933 | Lamborn et al. | June 13, 1933 |
| 1,958,303 | Hayes | May 8, 1934 |
| 2,438,866 | Rockwell | Mar. 30, 1948 |
| 2,551,652 | Vreeland | May 8, 1951 |